United States Patent [19]

Martin et al.

[11] Patent Number: 5,211,926
[45] Date of Patent: May 18, 1993

[54] PROCESS FOR EXTRACTING OF DISPOSING OF AMMONIA OR AMMONIA COMPOUNDS FROM DUST MIXTURES

[75] Inventors: Walter J. Martin, Tegernsee; Johannes J. E. Martin, Seeshaupt, both of Fed. Rep. of Germany; Stefan Hörler, Watt, Switzerland; Thomas Nikolaus, Allensbach, Fed. Rep. of Germany

[73] Assignees: Martin GmbH für Umwelt- und Energietechnik, Munich, Fed. Rep. of Germany; Techform Engineering AG, Watt, Switzerland

[21] Appl. No.: 812,579

[22] Filed: Dec. 20, 1991

[30] Foreign Application Priority Data

Dec. 21, 1990 [DE] Fed. Rep. of Germany ....... 4041380

[51] Int. Cl.⁵ ................................................. C01C 3/00
[52] U.S. Cl. ....................................... 423/237; 423/238
[58] Field of Search ................................ 423/237, 238

[56] References Cited

U.S. PATENT DOCUMENTS

| | | | |
|---|---|---|---|
| 3,985,859 | 10/1976 | Blaine | 423/238 |
| 4,093,544 | 6/1978 | Ross | 423/238 |
| 4,477,355 | 10/1984 | Liberti et al. | 210/655 |

FOREIGN PATENT DOCUMENTS

| | | |
|---|---|---|
| 0135148 | 3/1985 | European Pat. Off. |
| 0292012 | 1/1988 | European Pat. Off. |
| 0309742 | 4/1989 | European Pat. Off. |
| 0379040 | 7/1990 | European Pat. Off. |
| 1792027 | 10/1971 | Fed. Rep. of Germany |
| 3530498 | 3/1987 | Fed. Rep. of Germany |
| 3711503 | 10/1988 | Fed. Rep. of Germany |
| 3815963 | 11/1989 | Fed. Rep. of Germany |

OTHER PUBLICATIONS

Japanese Patent Abstract-Kokai No. 54-1156-99-Appln. No. 53-22463 Sep. 8, 1979.
Japanese Patent Abstract 1-11688(A)-Appln. No. 62-166044 Jan. 17, 1989.
Japanese Patent Abstract 84-052269/09 Jan. 19, 1984.
International Search Report in E 0 309 742 A3.
Chemical Abstract 821:160 1975.
Chemical Abstract 89.64695a 1978.

*Primary Examiner*—Gregory A. Heller
*Attorney, Agent, or Firm*—McAulay Fisher Nissen Goldberg & Kiel

[57] ABSTRACT

In order to recover or dispose of ammonia or ammonia compounds from mixtures of dust that occur during combustion processes, during subsequent gas cooling, or during subsequent gas scrubbing, the dust that is created is mixed in batches with water in a closed system at a temperature that is lower or equal to the temperature at which the dust leaves the combustion, cooling or scrubbing process, and the resulting vapors are drawn off in a vacuum.

6 Claims, No Drawings

PROCESS FOR EXTRACTING OF DISPOSING OF AMMONIA OR AMMONIA COMPOUNDS FROM DUST MIXTURES

BACKGROUND OF THE INVENTION

1. Field of the Invention

The present invention relates to a process for extracting or disposing of ammonia or ammonia compounds that occur during combustion processes and subsequent gas cooling and/or gas scrubbing.

2. Description of the Prior Art

During the treatment of exhaust gases that result from combustion processes, in order to reduce the concentration of nitrous oxide, either ammonia is added to the flow of gas ahead of a reduction (SCR process) or else ammonia or a substance that forms ammonia under the effects of temperature (e.g., urea, ammonium carbonate) is sprayed into the gas flow at a temperature range that is above 700° C. (SNCR process). In both cases, some of the ammonia will not be used up during the process that reduces the $NO_x$ and will be carried out in the exhaust gases in the form of so-called ammonia slip [Ammoniakschlupf—Tr.]. This contaminates not only the atmosphere, but also any subsequent exhaust gas scrubbing systems, if ammonia or ammonia compounds (ammonium chloride, ammonium sulfate, ammonium bisulfite) are flushed out with the dust from a filter system.

It is true that the ammonium salts, which are formed in the exhaust-gas section at temperatures in excess of 300° C., can be removed effectively with cloth filters; however, problems are encountered when such filter dusts are subjected to further processing. These problems lie in the fact that the filter dust is dampened with water in order to make it easier to handle. When this is done, the ammonium salts give up their ammonia, which then escapes into the atmosphere. In order to prevent this uncontrolled escape of ammonia, which can also occur during subsequent dumping, according to the state of the art, the filter dusts can now be subjected to a stripping process in which the ammonia is to a large extent driven off. However, during this stripping process, the filter dust is heated with steam or electrically, and subsequently moistened, which means that in addition, heavy metals and their compounds, in particular mercury, can escape in the form of gas, which leads to further environmental problems.

SUMMARY OF THE INVENTION

It is the task of the present invention to describe a process with the help of which the ammonia that is contained in mixed dust in the form of ammonia salts can be recovered. According to the present invention, a process for recovering or for disposing of ammonia or ammonia compounds from dust mixtures that occur during combustion processes, during subsequent gas cooling and/or gas scrubbing, is recited wherein the dusts that are generated are mixed with water at a temperature that is lower or equal to the temperature at which the dust leaves the combustion, cooling or scrubbing process. The water is added to the dust in batches in a closed system, and the vapors which result therefrom, are drawn off in a vacuum. Because the dust mixture is treated in batches in the closed system, i.e., in closed mixers, the ammonia that escapes when it is moistened is drawn off in a vacuum, which prevents the uncontrolled escape of the ammonia to the atmosphere. What is important in this respect is the advantage that no other injurious substances, e.g., heavy metals, are liberated, since all work is carried out at low temperatures.

DESCRIPTION OF THE PREFERRED EMBODIMENTS

In order to recover as much as possible of the ammonia that is contained in bound form in the dust mixtures, it is recommended that the amount of water used to moisten the dust mixture be increased above the quantity that is normally used to moisten the dust for proper transportation, i.e., to a water content of between 25 and 40%-wt. In particular, increasing the vacuum also leads to a greater escape of the ammonia from these solid compounds.

The recovery of ammonia from the dust mixture is particularly effective if the pH value of the dust is greater than 10.

If the dust mixtures result from a gas scrubbing process that is incorporated downstream from a combustion process and a hot gas de-nitrification apparatus (SNCR process), a further development of the present invention recommends that the ammonia that is recovered be returned to the gas scrubbing process, which means that the quantity of the chemicals that have to be replenished so as to reduce the nitrous oxide can be cut down.

What is claimed is:

1. A process for removing ammonia or ammonia compounds from dust which results from prior thermal treatment processes, comprising the steps of:
   mixing the dust with water at an environmental temperature that is lower or equal to the temperature at which the dust leaves the prior treatment processes, the mixing step being performed in batches in a closed system, and
   collecting vapors which result from the mixing step using a vacuum.

2. The process as defined in claim 1, wherein the water amount of water contained in the water and dust mixture is adjusted to be between 25 and 40% by weight.

3. The process as defined in claim 1, wherein the vacuum is increased in order to increase the quantity of ammonia that is driven off during the mixing step.

4. The process as defined in claim 1, further comprising an initial pH adjusting step wherein the pH value of the dust is adjusted to a value that is greater than 10.

5. The process as defined in claim 1, wherein the ammonia that is removed is returned to the one of the prior treatment processes.

6. The process as defined in claim 5, wherein the ammonia that is removed is returned to a prior gas scrubbing treatment process.

* * * * *